(12) United States Patent
Khubani

(10) Patent No.: US 10,239,545 B2
(45) Date of Patent: Mar. 26, 2019

(54) TRANSPORTING APPARATUS

(71) Applicant: DaVinci II CSJ, LLC, Wilmington, DE (US)

(72) Inventor: Ajit Khubani, Saddle River, NJ (US)

(73) Assignee: DaVinci II CSJ, Inc., Fairfield, NJ (US)

( * ) Notice: Subject to any disclaimer, the term of this patent is extended or adjusted under 35 U.S.C. 154(b) by 0 days.

(21) Appl. No.: 15/668,384

(22) Filed: Aug. 3, 2017

(65) Prior Publication Data

US 2019/0039635 A1 Feb. 7, 2019

(51) Int. Cl.
*B62B 1/12* (2006.01)
*B62B 1/00* (2006.01)

(52) U.S. Cl.
CPC .............. *B62B 1/12* (2013.01); *B62B 1/008* (2013.01); *B62B 2205/003* (2013.01); *B62B 2205/20* (2013.01); *B62B 2301/08* (2013.01); *B62B 2301/14* (2013.01)

(58) Field of Classification Search
CPC ..................................... B62B 3/02; B62B 1/12
See application file for complete search history.

(56) References Cited

U.S. PATENT DOCUMENTS

| | | | |
|---|---|---|---|
| 2,736,564 A | 2/1956 | Loam et al. | |
| 3,177,000 A * | 4/1965 | Alexander | B62B 1/12 |
| | | | 280/47.24 |
| 3,326,563 A | 6/1967 | Whitaker | |
| 3,346,269 A | 10/1967 | Soto | |
| 3,515,401 A | 6/1970 | Gross | |
| 4,142,732 A | 3/1979 | Boyd | |
| D356,197 S | 3/1995 | Loughlin | |
| 5,941,543 A * | 8/1999 | Kazmark, Jr. | B62B 1/002 |
| | | | 280/47.29 |
| 8,641,059 B2 | 2/2014 | Khodor et al. | |
| 9,187,106 B2 | 11/2015 | Khodor | |
| 9,616,907 B1 * | 4/2017 | Gibson | B62B 1/12 |
| 2008/0238003 A1 * | 10/2008 | Burkard | B62B 1/10 |
| | | | 280/5.32 |
| 2012/0153710 A1 * | 6/2012 | Ryan | B62B 1/12 |
| | | | 301/111.1 |

* cited by examiner

*Primary Examiner* — James A Shriver, II
*Assistant Examiner* — James J Triggs
(74) *Attorney, Agent, or Firm* — Cooper & Dunham, LLP

(57) ABSTRACT

A transporting apparatus including a top portion pivotally coupled to a middle portion via a latching assembly, the latching assembly including a biasing element and a latching element, the biasing element biasing latching element in a closed position which releasably secures the top portion to the middle portion in an extended position.

11 Claims, 8 Drawing Sheets

TRANSPORTING APPARATUS

FIELD

Embodiments of the present invention are generally directed to an apparatus for transporting objects.

BACKGROUND

Transporting lots of objects can be difficult and tiring. Hand trucks, dollies, carts, wheelbarrows, etc. can be convenient and can allow users to carry large amounts of objects at once. Despite the convenience of such carts, many carts can be difficult to maneuver, burdensome, and/or bulky. Further, many transporting carts have difficulty going up and down stairs, and may take up too much room when not being used. Many carts only include two wheels, which make maneuvering up and down stairs difficult. Further, many carts cannot be folded or disassembled to save room during storage.

SUMMARY

Embodiments of the present invention can provide a transporting apparatus including a top portion coupled to a middle portion via a latching assembly, the latching assembly including a biasing element and a latching element, the biasing element biasing latching element in a closed position which releasable secures the top portion to the middle portion in an extended position.

According to certain embodiments, the latching element may be rotatably coupled about a latching axle. The latching element may include an elongated tubular body. The elongated tubular body may secure the middle portion to the top portion.

According to certain embodiments, the latching element may include a lever that facilitates movement of the latching element between the closed position and an open position. The latching assembly may include an angled portion.

According to certain embodiments, rotating the latching element between the closed position and an open position may cause the angled portion to engage a leg of the top portion such that the rotation of the latching element may be translated into a linear longitudinal displacement of the latching element.

According to certain embodiments, the transporting apparatus may include a wheel axle. The wheel axle may include at least one beveled tip to facilitate installation of a wheel assembly. The wheel assembly may include at least three wheels.

According to certain embodiments, the transporting apparatus may include a pivoting bottom portion which may include a curved portion configured to avoid pinching of a user between the bottom portion and a platform when in a collapsed position.

BRIEF DESCRIPTION OF THE DRAWINGS

The features and advantages of the present invention can be more readily understood from the following detailed description with reference to the accompanying drawings, wherein.

DETAILED DESCRIPTION

Figure 1:
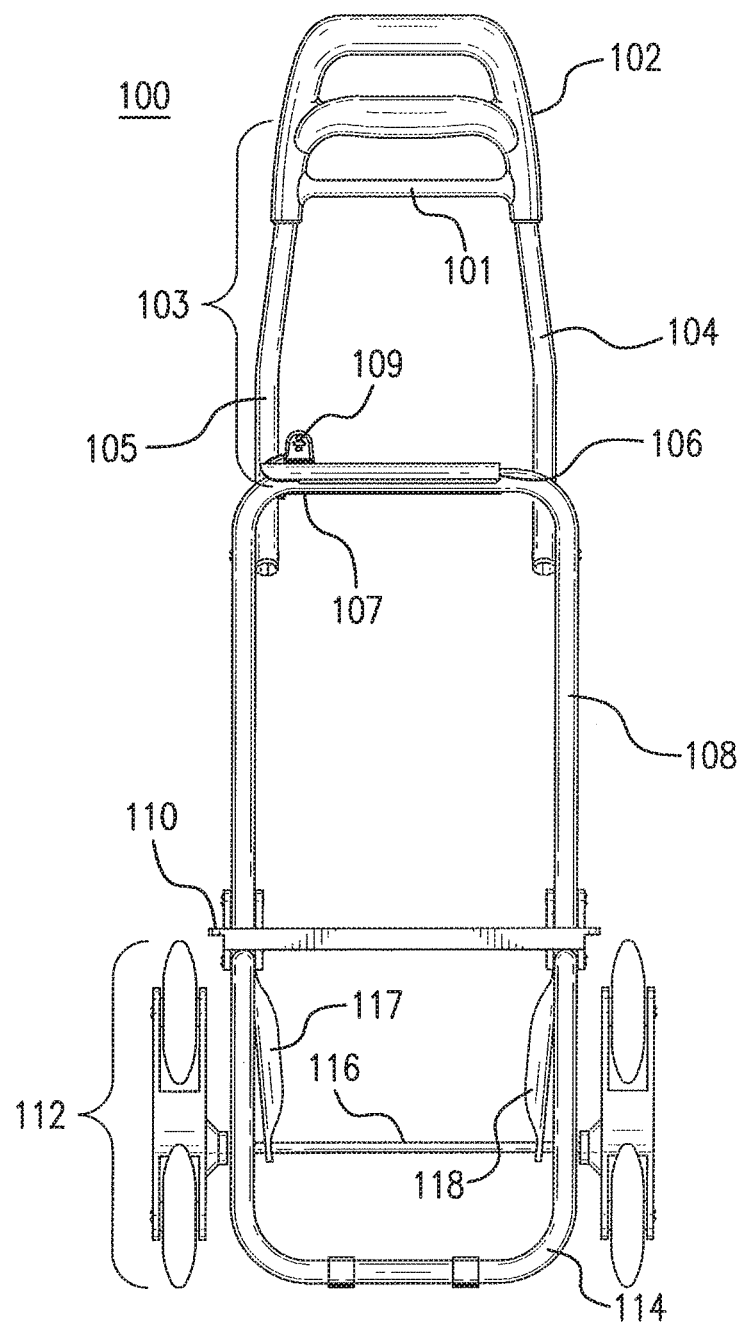
FIG. 1 is a diagram of an exemplary transporting apparatus according to one embodiment of the present invention.

Exemplary embodiments of the present invention can provide a novel transporting apparatus. Exemplary transporting apparatus 100 is shown in FIGS. 1-8. Exemplary transporting apparatus 100 can facilitate moving objects from one location to another, including up and down stairs. For example, exemplary transporting apparatus 100 can easily be used to move objects up and down stairs, over curbs, over rough terrain, large rocks, or any other similar difficult terrain.

As shown in FIGS. 1-8, exemplary transporting apparatus 100 can include top portion 103, latching assembly 106, middle portion 108, platform 110, wheel axle 116, wheel assembly 112, supporting legs 117, 118, and bottom portion 114. Top portion 103 may include handle 102 to provide a user an ergonomic handle for operating transporting apparatus 100. Alternatively, handle 102 can be utilized to attach various accessories. Further, top portion 103 may be pivotally coupled to middle portion 108 via latching assembly 106. For example, top portion 103 can be pivotally adjusted between a folded position and an extended position, and latching assembly 106 can releasably secure top portion 103 to middle portion 108 in the extended portion. Middle portion 108 may include securing portion 107 which can be secured into latching assembly 106 to secure top portion 103 to middle portion 108. Platform 110 may be rotatably coupled to middle portion 108 and further coupled to bottom portion 114. Supporting legs 117, 118 may be coupled to bottom portion 114 and further coupled to wheel axle 116. Wheel axle 116 may be disposed through bottom portion 114 and may be coupled to wheel assembly 112.

Figure 2:
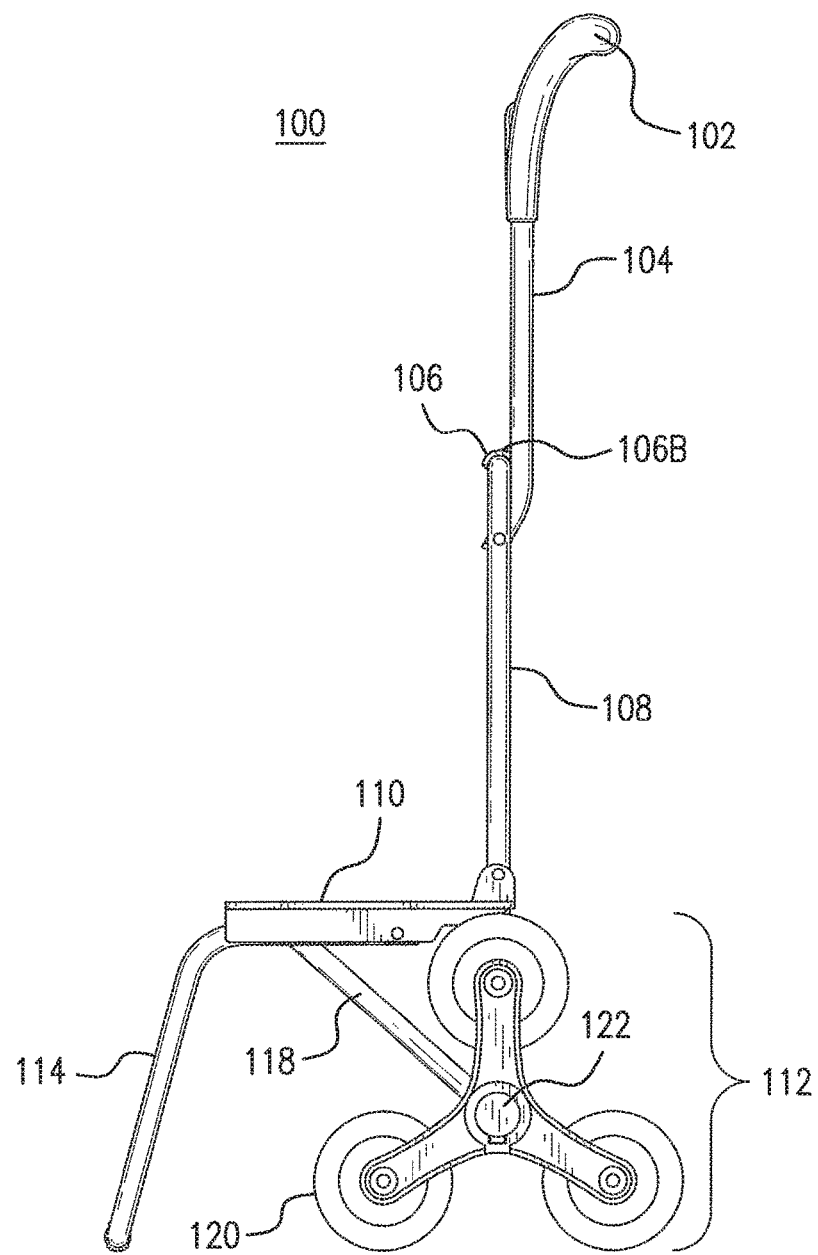
FIG. 2 is a diagram of an exemplary transporting apparatus according to one embodiment of the present invention.
Figure 3:
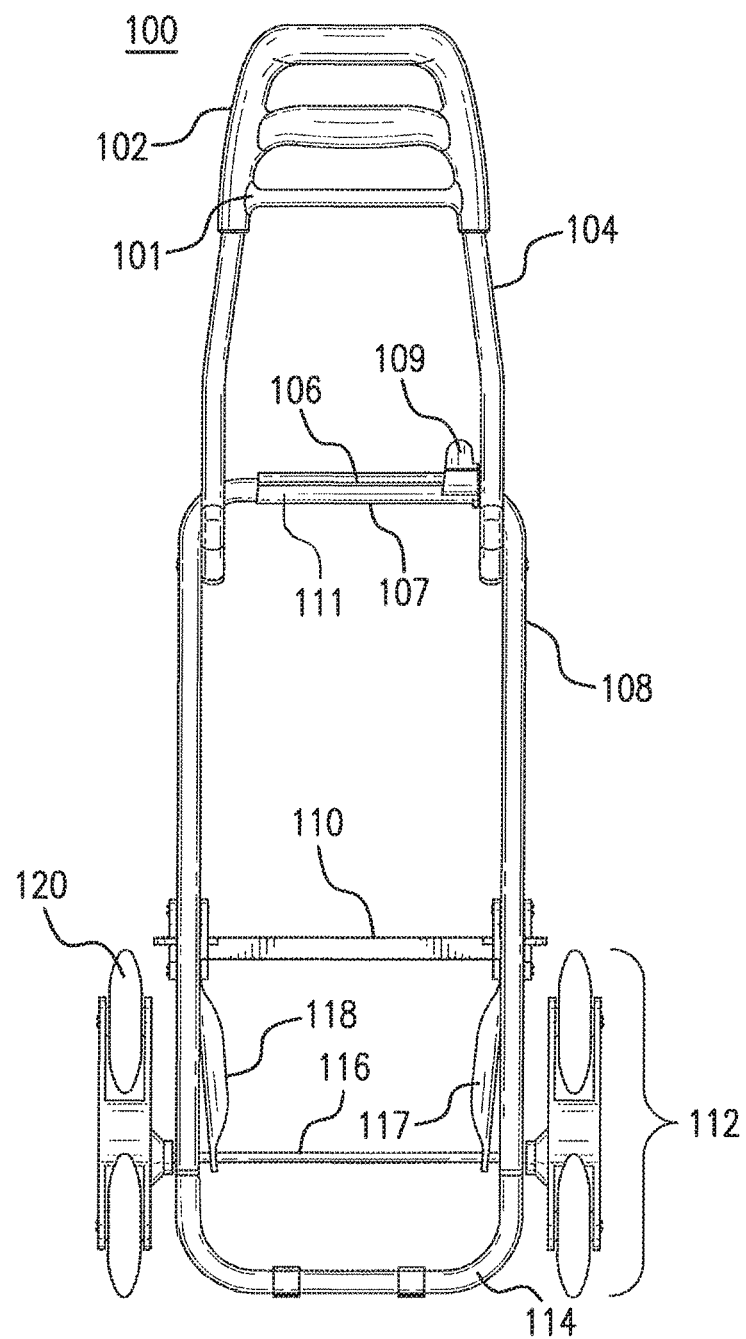
FIG. 3 is a diagram of an exemplary transporting apparatus according to one embodiment of the present invention.
Figure 4:
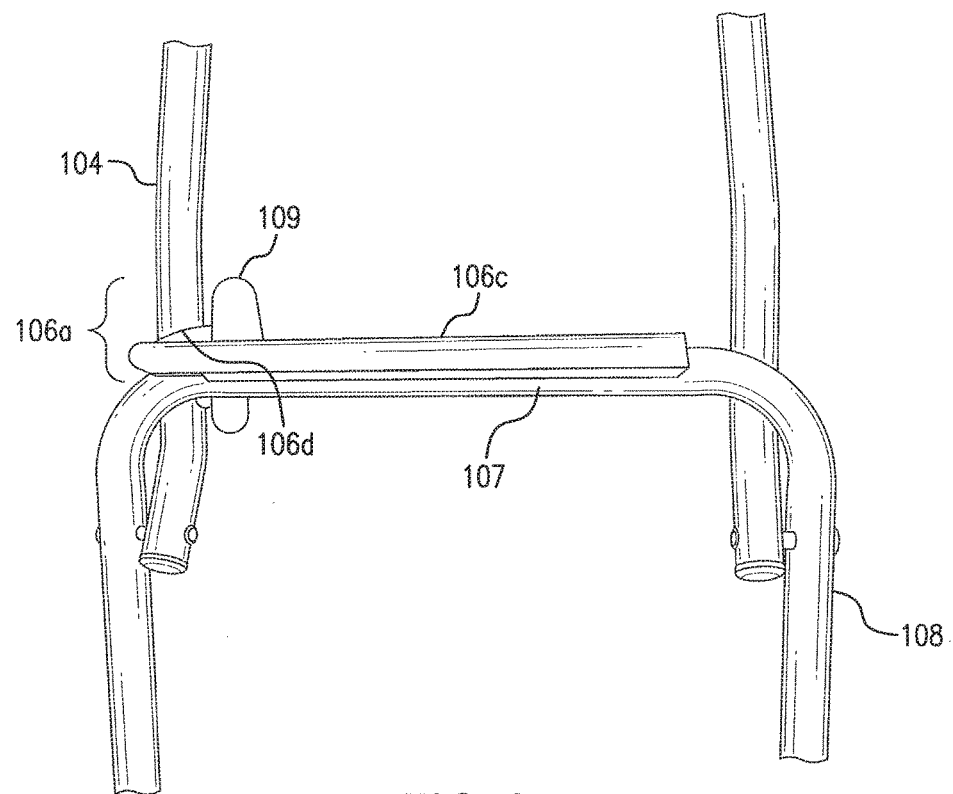
FIG. 4 is a diagram of an exemplary latching assembly according to one embodiment of the present invention

As shown in FIGS. 1-3, top portion 103 may include legs 104, 105, handle 102 and latching assembly 106. Handle 102 may include multiple levels for a user to place their hands. For example, as shown in FIGS. 1-3, handle 102 includes two levels for a user to place their hands. However, handle 102 may include one, three, four or any number of levels. Handle 102 may further include attachment bar 101 for attachment of accessories such as a bungee cord, an enclosed compartment, an additional shelf, a bag, etc. Handle 102 may be coupled to legs 104, 105 of top portion 103. In one embodiment of the present invention, handle 102 may be fixedly coupled to legs 104, 105. For example, handle 102 may be fixedly coupled to legs 104, 105 via welding, screws, adhesives or another method of fixedly coupling handle 102 to legs 104, 105. In another embodiment of the present invention, handle 102 may be removably coupled to legs 104, 105. For example, handle 102 may be removably coupled to legs 104, 105 via magnets, snap fasteners, Velcro, or any other method of removably coupling handle 102 to legs 104, 105. Further, exemplary transporting apparatus 100 may have interchangeable handles.

Figure 8:
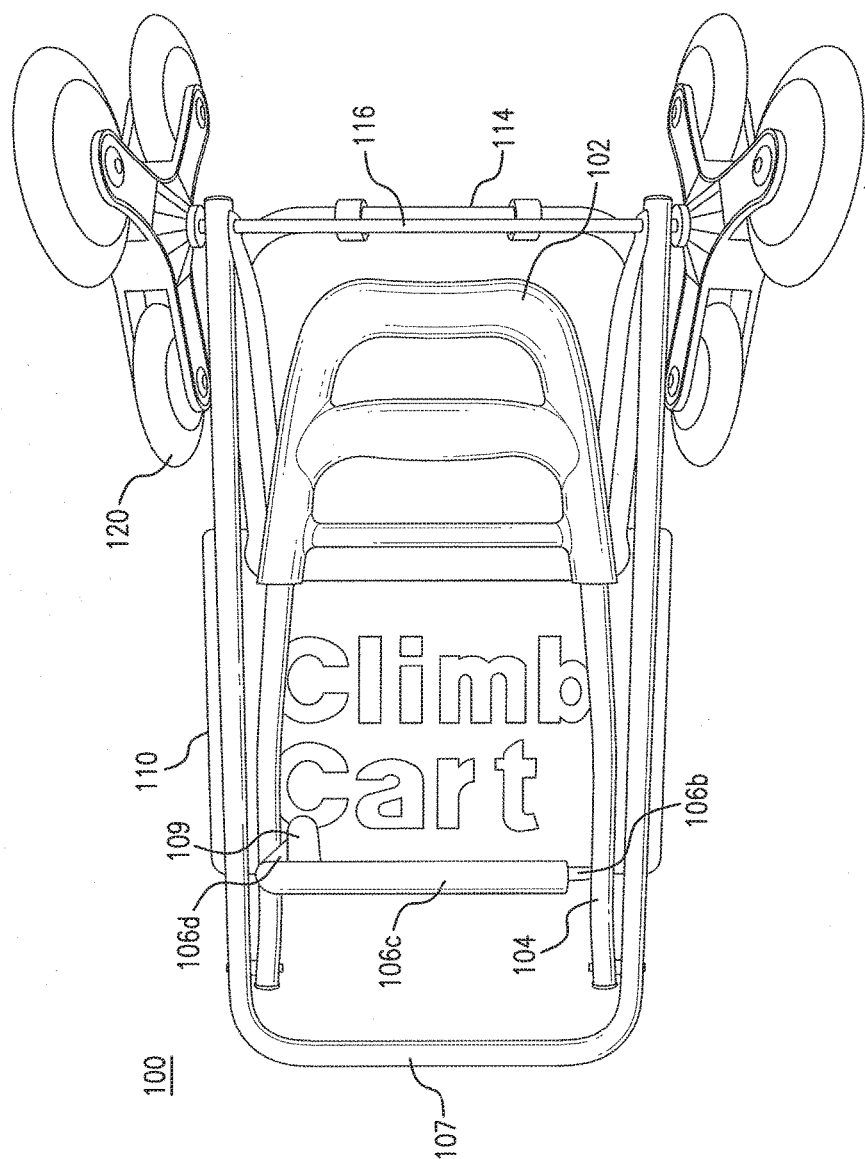
FIG. 8 is a diagram of an exemplary transporting apparatus according to one embodiment of the present invention.

FIG. 1 shows exemplary transporting apparatus 100 in an extended position. In the extended position, top portion 103 may be coupled to middle portion 108 via latching assembly 106. Further, platform 110 may be arranged substantially perpendicular to middle portion and may be coupled to bottom portion 114. FIG. 8 shows exemplary transporting 100 in a folded position. In the folded position, latching assembly 106 may not be coupled to middle portion 108 allowing top portion 103 to pivot about middle portion 108, causing top portion 103 to rest on between legs 104 and 105 of middle portion 108. Further, in the folded position, platform 110 may not be coupled to bottom portion 114 causing both platform 110 and bottom portion 114 to pivot about middle portion, and causing platform 110 to rest on middle portion 108.

As shown in the FIGS. 1-4 and 8, latching assembly 106 may include latching element 106a, biasing element 111, and latching axle 106b. Latching element 106a can include elongated tubular body 106c and a lever portion 109, and can be coupled to legs 104 and 105 via latching axle 106b. Latching element 106a can be actuatable between a closed latched position, in which top portion 103 is coupled to middle portion 108 in the extended position, and an open position, in which top portion 103 can be pivotally foldable relative to middle portion 108. According to certain embodiments, latching element 106a may be spring biased by biasing element 111 to remain in a closed position. In operation, a user may actuate lever 109, against the biasing element 111, to rotatably actuate latching element 106a about latching axel 106b from the closed latched position to the open position. Releasing lever 109 may cause latching assembly 106 to return to the closed position due to latching assembly 106 being spring biased by the biasing element 111 to remain in a closed position. Further, latching element 106a may include angled portion 106d, which can cooperate/engage with leg 104 such that the rotational actuation of latching element 106a is translated into a linear longitudinal displacement of latching element 106a along axel 106c. This angled portion 106c, may cause a reduction in the force required to depress lever 109.

As shown in FIG. 3, the bottom of middle portion 108 may include wheel axle 116 which may be placed through the bottom legs of middle portion 108. Wheel axle 116 may be affixed to the bottom legs of middle portion 108 via welding, glue, fasteners, or any other method of affixing wheel axle 116 to the bottom legs of middle portion 108. In one embodiment of the present invention, wheel axle 116 may be one piece. In another embodiment of the present invention, wheel axle 116 may include two pieces, each attached to the outside of the bottom legs of middle portion 108.

As shown in FIGS. 1-3 and 5, wheel assembly 112 may be coupled to wheel axle 116. In one embodiment, wheel assembly 112 may include three wheels 120. Wheel assembly 112 may include three wheels to allow transporting apparatus 100 to maneuver over stairs, curbs, ledges, large rocks, or any other type of similar obstacle. However, wheel assembly 112 may include any number of wheels. For example, wheel assembly 112 may include one, two, four, five, six or any number of wheels. Specifically, wheel assembly 112 may be coupled to wheel axle 116 and further may rotate about wheel axle 116. Wheels 120 may be coupled to wheel assembly and may rotate independent of wheel assembly 112. Accordingly, when transporting apparatus 100 is being pushed or pulled along a smooth surface, wheels 120 may rotate to allow transporting apparatus 100 to traverse the smooth surface. In practice, two wheels 120 may contact the smooth surface and wheel assembly 112 does not rotate. Alternatively, when transporting apparatus encounters an obstacle, such as a curb or a step, wheel assembly 112 may rotate which may cause all three wheels 120 of wheel assembly 112 to rotate. All three wheels 120 may contact the surface of the obstacle while wheel assembly 112 rotates to enable transporting apparatus 100 to traverse the obstacle. In one embodiment, wheels 120 may be removable from wheel assembly 112. Wheel assembly 112 may further include locking mechanism 122 and latch 113. Latch 113 may be used to open and close locking mechanism 122 of wheel assembly 112. Latch 113 may be used to couple wheel assembly 112 to wheel axle 116 via attachment points 121. Latch 113 may be spring biased to keep locking mechanism 122 in a locked position.

Figure 6:
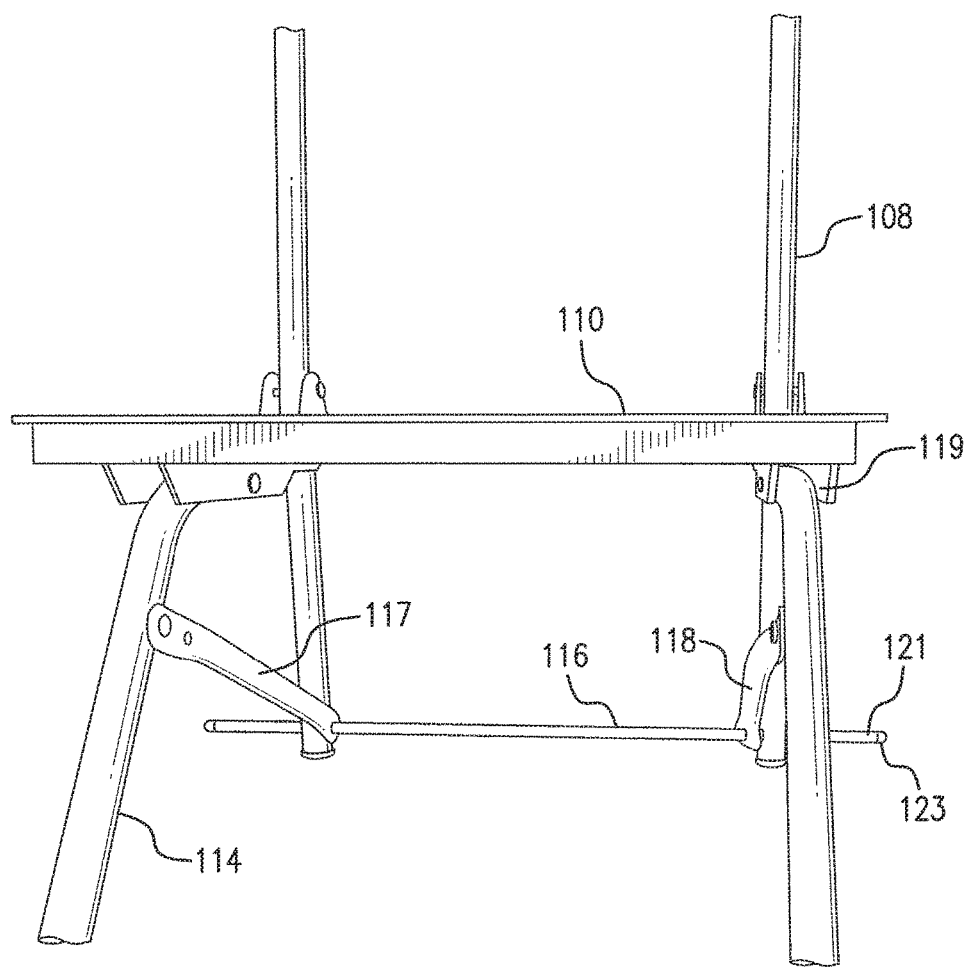
FIG. 6 is a diagram of an exemplary transporting apparatus according to one embodiment of the present invention.
Figure 7:
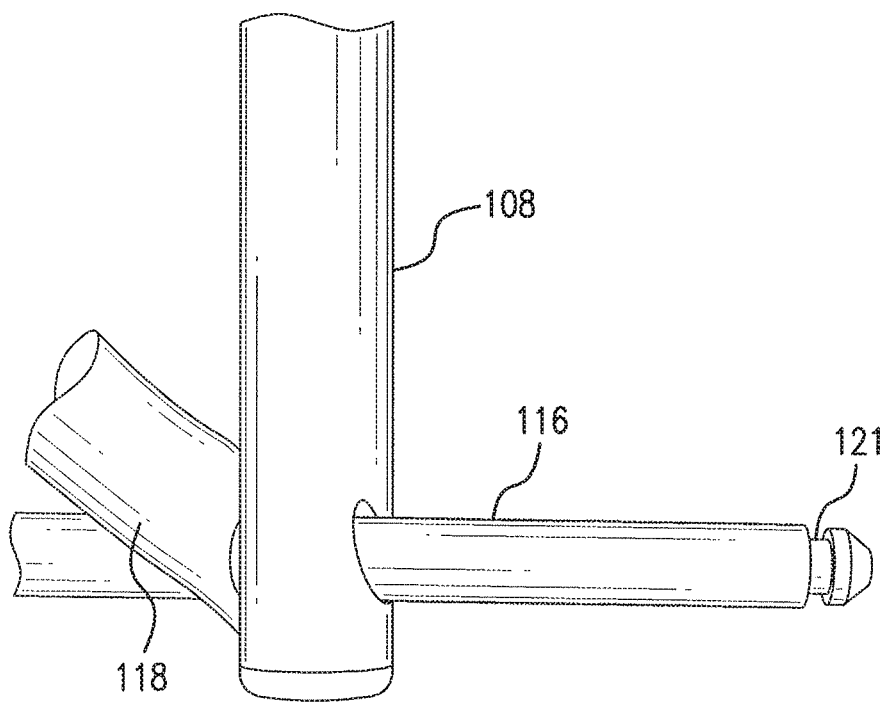
FIG. 7 is a diagram of an exemplary wheel axle according to one embodiment of the present invention.

As shown in FIGS. 6 and 7, wheel axle 116 may include attachment points 121 on either end. Attachment points 121 may include an indention for latching to wheel assembly 112. When latch 113 of wheel assembly 112 is depressed, locking mechanism 122 of wheel assembly 112 may open. When locking mechanism 122 of wheel assembly 112 is open, locking mechanism 122 may be coupled to attachment points 121 of wheel axle 116. In practice, latch 113 may be depressed to open locking mechanism 122 of wheel assembly 112 and attachment point 121 may be placed within locking mechanism 122. Latch 113 may be released to secure locking mechanism 122 around the indention of attachment point 121. In one embodiment attachment points 121 may include beveled ends 123. Beveled ends 123 of attachment points 121 may facilitate coupling of wheel axle 116 to wheel assembly 112. In practice where attachment points 121 include beveled ends 123, latch 113 does not need to be depressed to open locking mechanism 122. Beveled end 123 of attachment point 121 may enter locking mechanism 122 without latch 113 being depressed, allowing locking mechanism to be secured around the indention of attachment point 121, and thus coupling wheel assembly 112 to attachment point 121. In this embodiment, beveled ends 123 of attachment points 121 allow for attachment points 121 to couple to wheel assembly 112 without depressing latch 113. Beveled ends 123 reduces the force required for coupling of wheel assembly 112 to wheel axle 116. Specifically, in embodiments where exemplary transporting apparatus 100 includes beveled ends 123, the force required by a user to couple wheel assembly 112 to wheel axle 116 is reduced. Wheel assembly 112 may be removed from attachment points 121 by depressing latch 113 to open locking mechanism 122 of wheel assembly 112.

Figure 5:
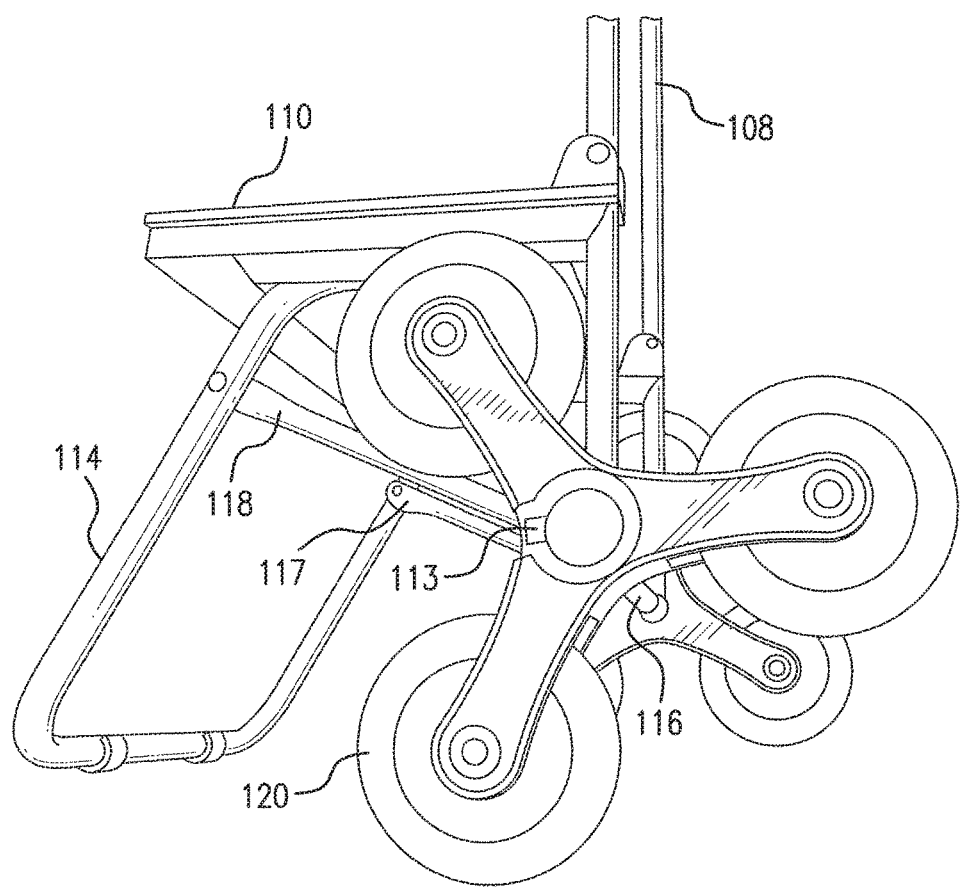
FIG. 5 is a diagram of an exemplary transporting apparatus according to one embodiment of the present invention.

As shown in FIGS. 2 and 3, wheel axle 116 may be further coupled to supporting legs 117, 118. In practice, supporting legs 117, 118 may be rotatably coupled to wheel axle 116 on one end and further rotatably coupled to bottom portion 114 on the other end. Supporting legs 117, 118 being rotatably coupled to middle portion 108 and bottom portion 114 may allow bottom portion to rotate away from and towards middle portion 108. As shown in FIGS. 2 and 5, platform 110 may be rotatably coupled to bottom portion 114. Platform 110 may be further rotatably coupled to middle portion 108. In practice, when platform 110 rotates upwards towards middle portion 108, bottom portion 114 may further rotate towards middle portion 108 due to bottom portion 114 and platform 110 being rotatably coupled. Further, platform 110 rotating towards middle portion 108 may cause supporting legs 117, 118 to rotate towards middle portion 108 as well due to platform 110 and supporting legs 117, 118 being rotatably coupled. In one embodiment of the present invention, platform 110 may include pressure fit channels located on the bottom of platform 110 configured to receive bottom portion 114. The pressure fit channels of platform 110 may allow platform 110 to be secured to bottom portion 114, preventing platform 110 from rotating. However, platform 110 may include snap fasteners, magnets, Velcro, or any other method of securing platform 110 to bottom portion 114.

In one embodiment of the present invention, platform 110 may be removable. In another embodiment of the present invention, the front of platform 110 may be coupled to middle portion 108 via magnets, fastener, or any other type of coupling device to secure platform 110 to middle portion 108.

In one embodiment of the present invention, as shown in FIG. 8, exemplary transporting apparatus 100 may be collapsible. In this embodiment, latching assembly 106 may not be coupled to securing portion 107 of middle portion 108, allowing top portion 104 to rotate towards and rest on middle portion 108. Further, platform 110 may rotate towards middle portion 108. As platform 110 rotates towards middle portion 108, bottom portion 114 and supporting legs 117, 118 may rotate towards middle portion 108 as well due to bottom portion 114 and supporting legs 117, 118 being rotatably coupled to platform 110. This may result in exemplary transporting apparatus 100 being reduced in size to allow for portability.

In one embodiment of the present invention, as shown in FIG. 5, bottom portion 114 may be pivoting. Pivoting bottom portion 114 may include a curved portion configured to avoid pinching of a user between bottom portion 114 and platform 110 when exemplary transporting apparatus 100 is in a collapsed position. Bottom portion 114 including a curved portion may prevent a user from suffering injuries to fingers or possible amputation during collapsing of exemplary transporting apparatus 100. In practice, all pivoting components may be curved or include a curved portion to prevent injuries to fingers or possible amputation during collapsing of exemplary transporting apparatus 100. Further, exemplary transporting apparatus 100 may be designed to have all pivoting components shaped to avoid injury to fingers or possible amputation. In one embodiment of the present invention, bottom portion 114 may include gripping attachments. For example, the point of surface contact of bottom portion 114 may include gripping attachments to prevent slipping of bottom portion 114 on a surface.

In one embodiment of the present invention, exemplary transporting apparatus 100 may include extensions and accessories. For example, a bungee cord may be coupled to platform 110 and further coupled to handle 102 at attachment bar 101. Exemplary transporting apparatus 100 may include a bag for holding items that may rest on platform 110 and may couple to handle 102 at attachment bar 101.

The embodiments and examples shown above are illustrative, and many variations can be introduced to them without departing from the spirit of the disclosure. For example, elements and/or features of different illustrative and exemplary embodiments herein may be combined with each other and/or substituted with each other within the scope of the disclosure. For a better understanding of the disclosure, reference should be had to any accompanying drawings and descriptive matter in which there is illustrated exemplary embodiments of the present invention.

The invention claimed is:

1. A transporting apparatus comprising:
a top portion pivotally coupled to a middle portion via a latching assembly,
the latching assembly including a biasing element, an angled portion, and a latching element, the biasing element biasing the latching element in a closed position to releasably secure the top portion to the middle portion in an extended position, wherein rotating the latching element between the closed position and an open position causes the angled portion to engage a leg of the top portion so that the rotation is translated into a linear longitudinal displacement of the latching element.

2. The transporting apparatus of claim 1, wherein the latching element is rotatably coupled about a latching axle.

3. The transporting apparatus of claim 2, wherein the latching element includes an elongated tubular body.

4. The transporting apparatus of claim 1, wherein the latching element includes a lever that facilitates movement of the latching element between the closed position and an open position.

5. The transporting apparatus of claim 1, further comprising a wheel axel including at least one beveled top to facilitate installation of a wheel assembly.

6. The transporting apparatus of claim 5, where in the wheel assembly includes at least three wheels.

7. The transporting apparatus of claim 1, wherein a pivoting bottom portion includes a curved portion configured to avoid pinching of a user between the bottom portion and a platform when in a collapsed position.

8. A transporting apparatus comprising:
a top portion having a handle;
a middle portion; and
a latching element including an angled portion and a biasing element,
the latching element rotatable between an open and a closed position such that during rotation of the latching element, the angled portion engages a leg of the top portion to translate the rotational movement to a linear longitudinal displacement of the latching element,
in the closed position, the latching element releasably securing the top portion in an extended position.

9. The transporting apparatus of claim 8, wherein the latching element includes an elongated tubular body.

10. The transporting apparatus of claim 9, wherein the latching element includes a lever that facilitates movement of the latching element between the closed position and the open position.

11. The transporting apparatus of claim 10, wherein the lever is connected to the angled portion.

* * * * *